Figure 1:
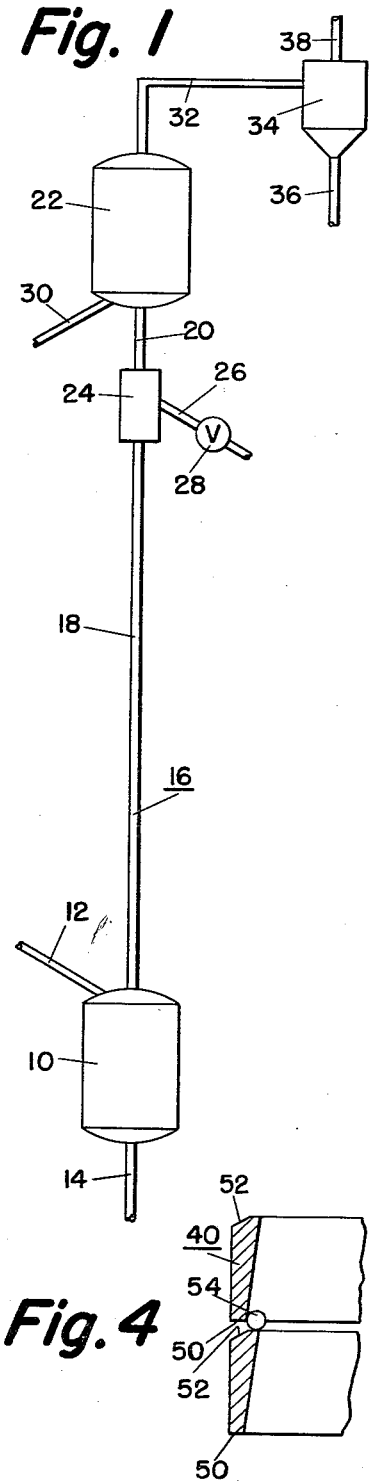

Aug. 21, 1962 L. W. LARSEN ET AL 3,050,343
PNEUMATIC ELEVATION OF GRANULAR SOLIDS
Filed April 29, 1958

INVENTOR.
WILLIAM L. MCCLURE
LAWRENCE W. LARSEN
BY Roberto Spindle
ATTORNEY 3,050,343
PNEUMATIC ELEVATION OF GRANULAR SOLIDS
Lawrence W. Larsen and William L. McClure, Toledo, Ohio, assignors to Sun Oil Company, Philadelphia, Pa., a corporation of New Jersey
Filed Apr. 29, 1958, Ser. No. 731,757
5 Claims. (Cl. 302—53)

This invention relates to elevation of granular solids in suspension in a lifting gas such as flue gas, air, steam, etc., and more particularly to a manner of controlling the height of rise in a disengager vessel into which the solids are discharged from the lift conduit.

It is known in the art to control the height of rise in disengager vessels of pneumatic lifting systems for granular solids by withdrawing a portion of the lifting gas from the lift conduit prior to discharge of the lifting gas and suspended solids into the disengager. One disclosure relating to this manner of operation is contained in Carl E. Fowler, Jr., United States Patent No. 2,758,882, issued August 14, 1956. The control of the height of rise in this manner has recognized advantages with respect to avoiding excessive attrition of the granular solids in the disengager vessel.

One instance in which it is particularly desirable to be able to control the height of rise is that in which for some reason it is necessary or desirable to increase the rate of flow of granular solids through a lift conduit. In systems for catalytic cracking of relatively high molecular weight hydrocarbons to produce gasoline by contact with conversion-supporting granular solid catalyst, it may be desirable to increase the rate of flow in the lift conduit in order to introduce heat stored in the regenerated catalyst to the cracking reactor at a greater rate. An increase in the rate of flow through the lift conduit ordinarily brings about an increase in the height of rise in the disengager, and this may result in the catalyst particles striking other particles and/or the top of the disengager at an excessive velocity with resulting increased attrition of the granular solids. The removal of a portion of the lifting gas from the lift conduit prior to discharge into the disengager provides a manner of counteracting this tendency for increased height of rise.

In the prior apparatus for withdrawing a portion of the lifting gas from the lift conduit, certain disadvantages have been encountered. A typical manner of removing the gas is by the use of longitudinal slots in the lift conduit, the lifting gas passing through these slots into a chamber surrounding this portion of the lift conduit. A disadvantage of such slots resides in the fact that there is a tendency for excessive amounts of granular solids to pass out through the slots along with the lifting gas. The use of screens to prevent this is not a completely satisfactory solution since there is a tendency for catalyst to become stuck in the openings in the screen and thereby causes plugging of the apparatus. The present invention provides a construction which permits the removal of the lifting gas at a satisfactory rate, while minimizing the removal of granular solids along with the lifting gas and also avoiding plugging of the apertures through which the lifting gas is removed.

Figure 2:
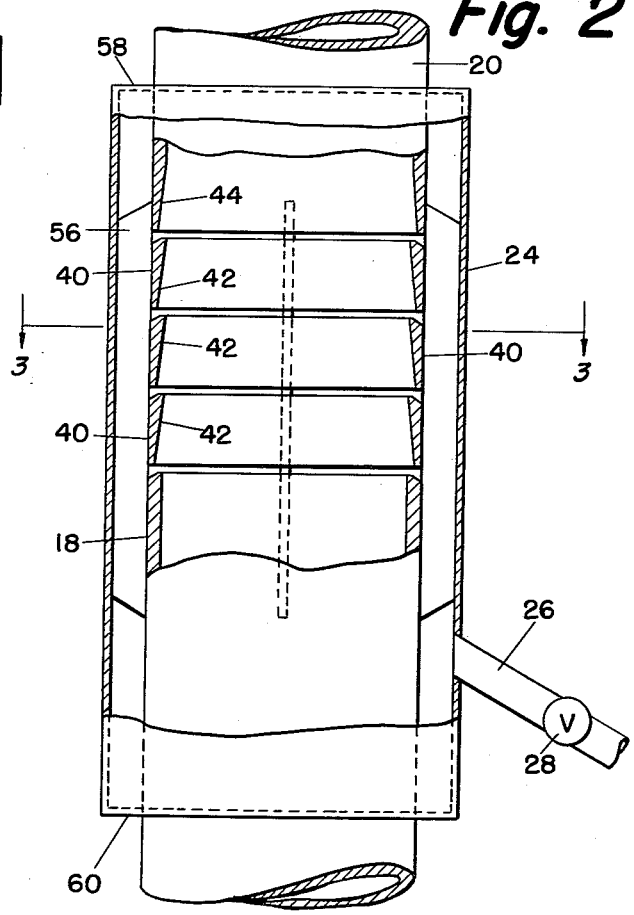
Figure 3:
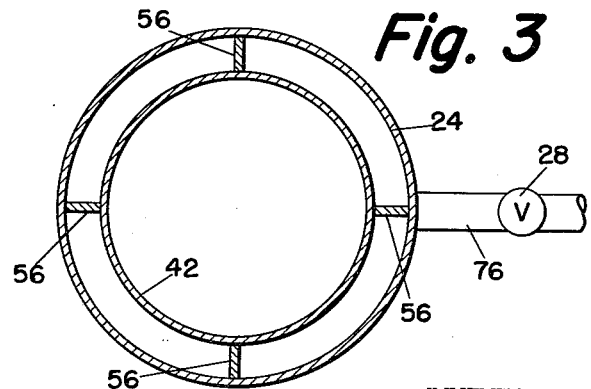
Figure 4:

The invention will be further described with reference to the attached drawing wherein FIGURE 1 is a schematic elevational view of the principal components of a pneumatic elevating system including engager vessel, lift conduit and disengager vessel. FIGURES 2 and 3 are sectional elevational and sectional plan views respectively of the apparatus designed for removal of lifting gas from an upper portion of the lift conduit. FIGURE 4 is a view of a portion of the apparatus shown in FIGURE 2, illustrating one principle involved in the construction according to the invention.

In FIGURE 1, engager vessel 10, lift conduit 16 and disengager vessel 22 are illustrated. Granular solids are introduced through line 12 into engager vessel 10. These solids usually comprise regenerated cracking catalyst withdrawn from the lower end of a conventional regeneration vessel not shown. Lifting gas such as flue gas is introduced through line 14 and carries the solids upwardly through lift conduit 16 which has a lower portion 18 and an upper portion 20. A portion of the lifting gas is withdrawn from the lift conduit into the annular chamber 24 and is withdrawn from the chamber through line 26 at a rate controlled by the setting of the valve 28.

The remainder of the lifting gas, together with the granular solids, is discharged into disengager 22 which is of conventional design. The granular solids are withdrawn through line 30 and introduced into a conventional cracking reactor not shown. The lifting gas, from which all solids except a small proportion of fine solids have been removed, is withdrawn through line 32 and passed through cyclone separator 34 for removal of the fine solids. The latter are withdrawn through line 36, and the nearly solids-free lifting gas through line 38.

In FIGURE 2, a drawing of the apparatus within chamber 24 is provided. Between the lower end of the portion 20 of the lift conduit and the upper end of the portion 18 of the lift conduit, a plurality of short conduit sections 40 are provided. Each one of these conduit sections has a frustoconical inner surface 42 which is slightly inclined upwardly toward the axis of the lift conduit. The lower portion of the portion 20 of the lift conduit also has a surface 44 which is inclined upwardly toward the axis of the lift conduit. The conduit sections 40 are vertically spaced from each other a short distance, in order to provide openings through which a portion of the lifting gas can escape into the chamber 24.

Referring to FIGURE 4, the preferred dimensions of the conduit sections, with respect to the particle size of the solids being elevated in the system, are illustrated. In FIGURE 4, 52 represents the upper surface of the wall of the conduit section, and 50 represents the lower surface of that wall. The minimum vertical distance between each surface 50 and the next surface 52 below is less than the major dimension of the average catalyst particle represented at 54. This fact makes it impossible for the particle 54 to escape through the opening between the surfaces 50 and 52.

It is further noted that the difference in inner radii of the lift conduit at the surfaces 50 and 52 is less than the major dimension of the solid particle, so that a particle in the position illustrated in FIGURE 4 extends inwardly toward the axis of the lift conduit to an extent farther than the upper surface 52 of the adjacent conduit section. This subjects the particle to the sweeping action of the lifting gas arising from below, with the result that particles are readily dislodged from the position shown in FIGURE 4, and plugging of the openings between the conduit sections by the solids is avoided.

The offset provided by the greater inner diameter at the lower ends than at the upper ends of the conduit sections, is further beneficial in that it aids in disengaging from the gas leaving the lift conduit, a large proportion also of those particles which are small enough to otherwise pass through the annular opening. Some particles which would otherwise be deflected outwardly by the surface 50 and carried into chamber 24 with the gas are, because of the offset, not thus deflected and are carried on up in the lift conduit.

It is further noted that parts of the upper surfaces 52 of the conduit sections are inclined upwardly toward the longitudinal axis of the lift conduit. This is a preferred though not essential feature of construction of the conduit sections.

Four spacing plates 56 are provided in order to support the conduit sections within the chamber 24 and provide the desired spacing from the chamber wall. In a typical construction, the spacing plates are in slidable relationship at their upper ends with the portion 20 of the lift conduit, in order to allow for unequal expansion between the lift conduit and chamber 24. The spacing plates are typically welded at their lower ends to the portion 18 of the lift conduit. The conduit sections 42 are welded to the spacing plates 56, and are thereby held at the desired position with respect to portion 20 of the lift conduit. The spacing plates are in slidable relationship with the wall of chamber 24.

Any other suitable construction allowing for unequal expansion of lift conduit 16 and chamber 24 can be provided. For example, the spacing plates 56 can be secured both to portions 18 and 20 of the lift conduit, and one of the latter portions can be permitted to slide within the annular closure plate 58 or 60. However, it is preferred that the portions 18 and 20 be rigidly secured within the plates 60 and 58 respectively, and the allowance for expansion provided by a sliding relationship between the spacing means and either the portion 18 or the portion 20 of the lift conduit.

The following example illustrates the apparatus according to the invention and its operation.

Granular solid silica-alumina cracking catalyst particles having an average particle diameter of 0.15 inch, the largest particles in the mixture having diameter of about 0.25 inch, are elevated through a lift conduit having diameter of 8 inches and height of about 200 feet. A construction as illustrated in FIGURES 2 and 3 is employed at a distance of about 10 feet from the lower end of the disengager. The height of each of the conduit sections 42 is 2 inches, and the spacing between the conduit sections is 3/32 of an inch.

At a lifting gas rate of 648 standard cubic feet per minute, the rate of passage of granular solids through the lift conduit is about 32 tons per hour, and the height of rise of the solids in the disengager is about 14.5 feet. Upon increasing the lifting gas rate to 720 standard cubic feet per minute, the rate of passage of granular solids through the lift conduit is increased to about 38 tons per hour, and the height of rise in the disengager is increased considerably over the 14.5 feet at the lower lifting gas rate. In order to reduce the height of rise to the 14.5 feet which is the maximum desired, lifting gas is removed through chamber 24 and conduit 26 at a rate of about 160 standard cubic feet per minute. This lifting gas contains about 0.25 pound of catalyst fines per 1000 cubic feet of air. Most of these particles are less than 6 microns in major dimension, although a few particles have size up to 300 microns. The lifting gas in line 38 contains about 0.18 pound of catalyst fines per 1000 cubic feet, and most of these fines are less than one micron in major dimension, although some fines have size up to 20 microns.

The inner diameter of each conduit section 42 is 7.980 inches at the upper end and 8.121 inches at the lower end. This provides a difference in the wall thickness at the upper and lower ends of about 0.07 inch, as compared with the average particle diameter of about 0.15 inch. This relationship makes it possible to keep the openings between the conduit sections substantially free of granular solids which might otherwise stick in the openings and interfere with the proper working of the apparatus.

The conduit sections 42 have frustoconical inner surfaces in order to provide the desired offset and to avoid erosion by the granular solids of the portions of the conduit sections above the apertures between the adjacent sections. When conduit sections having cylindrical inner surfaces are employed, the granular solids gradually erode the portions of the conduit sections above the apertures between the sections. This erosion is substantially reduced or eliminated by employing conduit sections having frustoconical inner surfaces. The angle with the vertical of the inner surfaces of the conduit sections is preferably within the approximate range from 0.5 to 5 degrees, more preferably 0.5 to 2 degrees.

The conduit sections 42 preferably have ratio of height to diameter within the approximate range from 0.1 to 0.5 in order to avoid excessive pressure drop between the upper and lower ends of the conduit section. When relatively high conduit sections are employed, the pressure drop between the upper and lower ends is relatively high, and excessive pressure drop is disadvantageous in that it tends to result in a portion of the lifting fluid which is removed through the aperture at the lower end of a conduit section passing upwardly in the chamber 24 and entering the lift conduit again through the aperture at the upper end of the conduit section. This tendency is substantially reduced or eliminated by employing relatively short conduit sections.

Any suitable number of conduit sections can be employed between the lower and upper portions 18 and 20 respectively of the lift conduit. Preferably a plurality of such conduit sections are provided. This makes it possible to provide the necessary total area of apertures for removal of lifting fluid while avoiding the provision of an undesirably large aperture between any given pair of conduit sections. In this manner, the excessive removal of granular solids from the lift conduit along with the removed portion of the lifting fluid is avoided.

The dimensions of the conduit sections and their spacing from each other are preferably such that the difference in inner radii between the upper and lower ends of the conduit sections is less than the average major dimension of the granular solids passing through the lift conduit. Also the minimum distance between the lower end of the wall of a conduit section and the upper end of the wall of the adjacent lower conduit section is preferably less than the average major dimension of the granular solids. The preferred dimensions and spacing are based upon the average major dimension of the solids, since it has been found that this permits avoiding plugging of the apparatus and also excessive loss of granular solids from the lift conduit, even though there are solids in the mixture being elevated which have major dimension less than the difference in radii mentioned before and less than the maximum distance between conduit sections mentioned before. The average major dimension as referred to herein is considered to be the major dimension at the peak, i.e. maximum percentage point, in a distribution curve obtained by plotting particle size against the percentage contained in the total mixture. Typically, the average major dimension in the case of granular cracking catalyst will be within the approximate range from 0.075 to 0.25 inch.

The invention claimed is:

1. In apparatus for elevating solid granular material from a lower vessel to an upper vessel through a lift conduit in communication with both vessels, the improvement which comprises a lift conduit having an upper and a lower portion, at least one conduit section having upwardly diminishing inner cross sectional area and situated between, and vertically spaced from, the upper and lower portions of the lift conduit, thereby to provide spaces adjacent the upper and lower ends respectively of said conduit section, said spaces providing communication between the interior of said lift conduit and the exterior thereof, and means for withdrawing a portion of the lifting fluid from the lift conduit through said spaces, said last named means comprising an enclosure surrounding said conduit section and said spaces, and a lifting fluid outlet conduit communicating with said enclosure.

2. Apparatus according to claim 1 wherein the inner wall of the conduit section is inclined at an angle with the vertical within the approximate range from 0.5 to 5 degrees.

3. Apparatus according to claim 1 wherein at least a portion of the upper surface of the conduit section wall is inclined upwardly toward the longitudinal axis of the lift conduit.

4. In apparatus for elevating solid granular material from a lower vessel to an upper vessel through a lift conduit in communication with both vessels, the improvement which comprises a lift conduit having an upper and a lower portion, a plurality of conduit sections each having upwardly diminishing inner cross sectional area and situated between, and vertically spaced from, the upper and lower portions of the lift conduit, said conduit sections being vertically spaced from each other, thereby to provide spaces therebetween and adjacent the upper and lower ends respectively of said conduit section, said spaces providing communication between the interior of said lift conduit and the exterior thereof, and means for withdrawing a portion of the lifting fluid from the lift conduit through said spaces, each of said conduit sections having a ratio of height to average diameter within the approximate range from 0.1 to 0.5.

5. Apparatus according to claim 4 wherein the difference between the inner radii at the upper and lower ends of each conduit section is less than the average major dimension of the granular solids, and the minimum distance between the lower end of the wall of each conduit section above the lowermost conduit section and the upper end of the wall of the adjacent conduit section therebeneath is less than the average major dimension of the granular solids.

References Cited in the file of this patent

UNITED STATES PATENTS

| | | |
|---|---|---|
| 2,693,395 | Berg | Nov. 2, 1954 |
| 2,699,970 | Closs | Jan. 18, 1955 |
| 2,727,792 | Bearer | Dec. 20, 1955 |
| 2,758,882 | Fowler | Aug. 14, 1956 |
| 2,977,154 | Bourguet | Mar. 28, 1961 |